United States Patent [19]
McDermott et al.

[11] Patent Number: 5,309,487
[45] Date of Patent: May 3, 1994

[54] MITIGATION OF STEAM GENERATOR TUBE RUPTURE IN A PRESSURIZED WATER REACTOR WITH PASSIVE SAFETY SYSTEMS

[75] Inventors: Daniel J. McDermott, Export; Kenneth J. Schrader, Penn Hills; Terry L. Schulz, Murrysville Boro, all of Pa.

[73] Assignee: Westinghouse Electric Corp., Pittsburgh, Pa.

[21] Appl. No.: 903,683

[22] Filed: Jun. 24, 1992

[51] Int. Cl.$^5$ .................. G21C 15/18; G21C 17/035
[52] U.S. Cl. .................................. 376/250; 376/299
[58] Field of Search ............... 376/250, 299, 282, 283

[56] References Cited

U.S. PATENT DOCUMENTS

| | | | |
|---|---|---|---|
| 3,935,738 | 2/1976 | Benham | 73/295 |
| 4,692,297 | 9/1987 | Schlonski et al. | 376/283 |
| 4,753,771 | 6/1988 | Conway et al. | 376/299 |

OTHER PUBLICATIONS

Ronald Vijuk, et al., AP600 Offers a Simpler Way To Greater Safety, Operability and Maintainability, Nuclear Engineering International, Nov. 1988, pp. 22–28.

*Primary Examiner*—Daniel D. Wasil
*Attorney, Agent, or Firm*—J. C. Valentine

[57] ABSTRACT

The effects of steam generator tube ruptures in a pressurized water reactor are mitigated by reducing the pressure in the primary loop by diverting reactor coolant through the heat exchanger of a passive heat removal system immersed in the in containment refueling water storage tank in response to a high feed water level in the steam generator. Reactor coolant inventory is maintained by also in response to high steam generator level introducing coolant into the primary loop from core make-up tanks at the pressure in the reactor coolant system pressurizer. The high steam generator level is also used to isolate the start-up feed water system and the chemical and volume control system to prevent flooding into the steam header.

12 Claims, 2 Drawing Sheets

MITIGATION OF STEAM GENERATOR TUBE RUPTURE IN A PRESSURIZED WATER REACTOR WITH PASSIVE SAFETY SYSTEMS

Government Contract

The Government of the United States of America has rights in this invention pursuant to Contract No. DE-ACO3-90SF18495 awarded by the Department of Energy.

BACKGROUND OF THE INVENTION

1. Field of the Invention

This invention relates to pressurized water reactors and more particularly to responses to the rupture of steam generator tubes using passive safety systems without the need for intervention by an operator.

2. Background Information

In a pressurized water reactor (PWR) nuclear power plant, reactor coolant in the form of light water is circulated through the core of a reactor where it is heated by controlled fission reactions in fuel contained within fuel assemblies making up the core. The heated coolant is circulated within containment in a primary circuit through a hot leg to a steam generator where it passes through heat exchanger tubes and then returns to the core through a cold leg. Feed water covering the heat exchanger tubes in the steam generator is converted into steam which is circulated in a secondary circuit to a turbine generator outside of containment which uses the steam to generate electricity.

If a leak develops in one of the thousands of heat exchanger tubes in the steam generator, primary coolant leaks into the feed water in the secondary side of the steam generator. This is a compromise of the primary-secondary loop barrier and has several adverse consequences. First, it results in a loss of coolant in the reactor coolant system. The PWR includes a pressurizer which is a tank containing reactor coolant and a head of steam which maintains pressure in the primary loop. For small steam generator tube ruptures, the pressurizer can maintain the pressure in the primary loop for a period of time.

Conventionally, the PWR also has a chemical and volume control system which regulates the concentration of moderators in the reactor coolant and provides makeup coolant. In the event of a moderate steam generator tube rupture, the chemical and volume control system can make up for the loss of reactor coolant. However, this system adds coolant to the primary loop under pressure so that coolant is continually lost through the rupture.

PWRs also have safety injection systems which inject coolant into the reactor should the pressure drop below a predetermined level. Pressurized water reactors further have a refueling water supply tank used for refueling but also available to flood the reactor core in the event of a severe loss of coolant accident (LOCA).

Another adverse affect of a ruptured steam generator tube is that it floods the secondary side of the steam generator. Automatic controls which regulate the level of feed water in the steam generator terminate the flow of feed water in the event primary fluid leaks into the secondary side of the steam generator. However, even with the flow of feed water terminated, if the leak is sufficient, primary coolant can completely flood the secondary side of the steam generator and overflow into the steam line. This can result in a radiation leak through pressure relief valves provided in the secondary circuit.

Currently, in the event of a rupture of a steam generator tube, the plant operators are required to perform a number of actions. First, they must identify that the event has occurred. This can be accomplished by observing relative steam generator feed water levels between two or more steam generators in the plant. The steam generator in which the feed water rises faster than the others is the faulted unit. Also radiation levels in the steam generator blow-down lines can help identify the condition. The operator must isolate the faulted steam generator by closing the main steam line isolation valve for that steam generator. The reactor is then cooled down using the intact steam generator by reducing steam side pressure. The operator either reduces the pressure set point of the steam bypass controller which dumps steam to a condenser, or the operator reduces the set point of the steam generator power operated relief valve(s). Once the reactor is cooled down sufficiently (about 50° F.), it is possible to reduce the reactor pressure to equal that of the isolated faulted steam generator which will terminate the leak. Normally, this will be done by the operator opening a pressurizer spray valve which will condense some steam in the pressurizer thereby reducing the pressure.

The normal response of the previously mentioned safety injection system is to provide higher pressure injection during the postulated event. However, once the reactor pressure is reduced to equal the faulted steam generator pressure (typically about 1,100 psig), the high pressure safety injection pumps will naturally increase their injection and tend to repressurize the reactor. To prevent this repressurization, which would restart the steam generator tube leak, the safety injection pumps have to be stopped. The operators are required to carefully check the reactor conditions to ensure that it is safe to stop the high pressure injection pumps.

The above procedures are designed for responding to a rupture in a single steam generator tube. Currently, regulators are also interested in plant performance in the event of multiple steam generator tube ruptures, namely, in the range of three to seven tube ruptures. In current plants, such an event might result in over filling of the faulted steam generator because of the very rapid operator response that would be required.

Currently, there are passive safety systems under development for PWRs. Such passive systems do not rely upon active components such as pumps and do not require operator action. U.S. Pat. No. 4,753,771 assigned to the assignee of the present invention is directed to passive safety systems for PWRs. One such system is a passive heat removal system which utilizes a heat exchanger immersed in the cold coolant in the refueling water supply tank and connected between the hot and cold legs of the primary circuit. A normally closed valve prevents flow through this heat exchanger under normal conditions. When the temperature of the reactor coolant reaches a predetermined value, such as would occur for example if the steam generator was not providing sufficient heat removal, the valve is opened and reactor coolant circulates by convection through the heat exchanger to remove decay heat from the coolant. The PRHR HX may alternatively be actuated when the SG water level drops to a predetermined level.

Another passive safety system described in U.S. Pat. No. 4,753,771 is a core make-up tank. The core make-up tank(s) contain cold reactor coolant and are pressurized by steam provided through a steam line from the pressurizer. A normally closed valve isolates the core make-up tank(s) from the primary loop. If the liquid level in the pressurizer drops below a predetermined level, the valve is opened to connect the core make-up tank(s) to the primary system. The core make-up tank is mounted relative to the pressurizer so that under these conditions, the liquid level in the core make-up tank will be sufficient such that the core make-up tank will add coolant to the primary loop. This would make up for minor losses of reactor coolant in the event of a steam generator tube rupture; however, this system does not respond until the level in the pressurizer has dropped to the predetermined level.

There is a need for an improved apparatus and method for responding to a steam generator tube rupture to quickly terminate the leak while assuring proper continued cooling of the reactor core, and particularly an apparatus and method which utilizes passive safety systems and does not require the intervention of an operator.

SUMMARY OF THE INVENTION

These needs and others are satisfied by the invention which is directed to a pressurized water reactor in which the effects of the steam generator tube rupture are mitigated by monitoring the steam generator water level to detect this condition. When the steam generator water level reaches a preselected high level, a passive heat removal system is activated to lower the pressure in the primary circuit to terminate the leak. At the same time, the isolation valve for the core make-up tank is opened to maintain the inventory of reactor coolant. This does not result in repressurization of the primary loop, as the core make-up tank pressure follows the pressure in the primary loop regulated by the pressurizer. The invention further includes isolating the chemical and volume control system so that the primary loop pressure can be reduced, and also to isolate the non-safety start-up feed water system to prevent overflow into the steam lines.

More particularly, the invention is directed to a pressurized water reactor having a reactor core within a reactor vessel, a steam generator having a plurality of heat transfer tubes, a reactor coolant system circulating reactor coolant through the reactor core and the heat transfer tubes of the steam generator under pressure in a primary loop, a pressurizer maintaining reactor coolant pressure in the primary loop, a turbine generator, a feed water supply system supplying feed water to the steam generator which covers the heat transfer tubes and is converted to steam which in turn is circulated to the turbine generator in a secondary loop through a steam line near the top of the steam generator, steam generator level indicators measuring feed water level in the steam generator, and safety systems maintaining cooling of the reactor core and including a passive heat removal system comprising a cold coolant storage tank, a heat exchanger immersed in the cold coolant storage tank, and first piping with first valve means which when opened diverts reactor coolant in the primary loop through the heat exchanger to remove decay heat, the improvement comprising steam generator heat transfer tube rupture mitigation means comprising means responsive to a selected high level of feed water in the steam generator as measured by the steam generator feed water level indicating means to open the first valve means. The high level of feed water signal is also used to connect the core make-up tank to the reactor coolant system to maintain coolant inventory while permitting the pressure to be reduced by the passive heat removal system and to isolate, the start-up feed water supply system and the chemical and volume control system.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
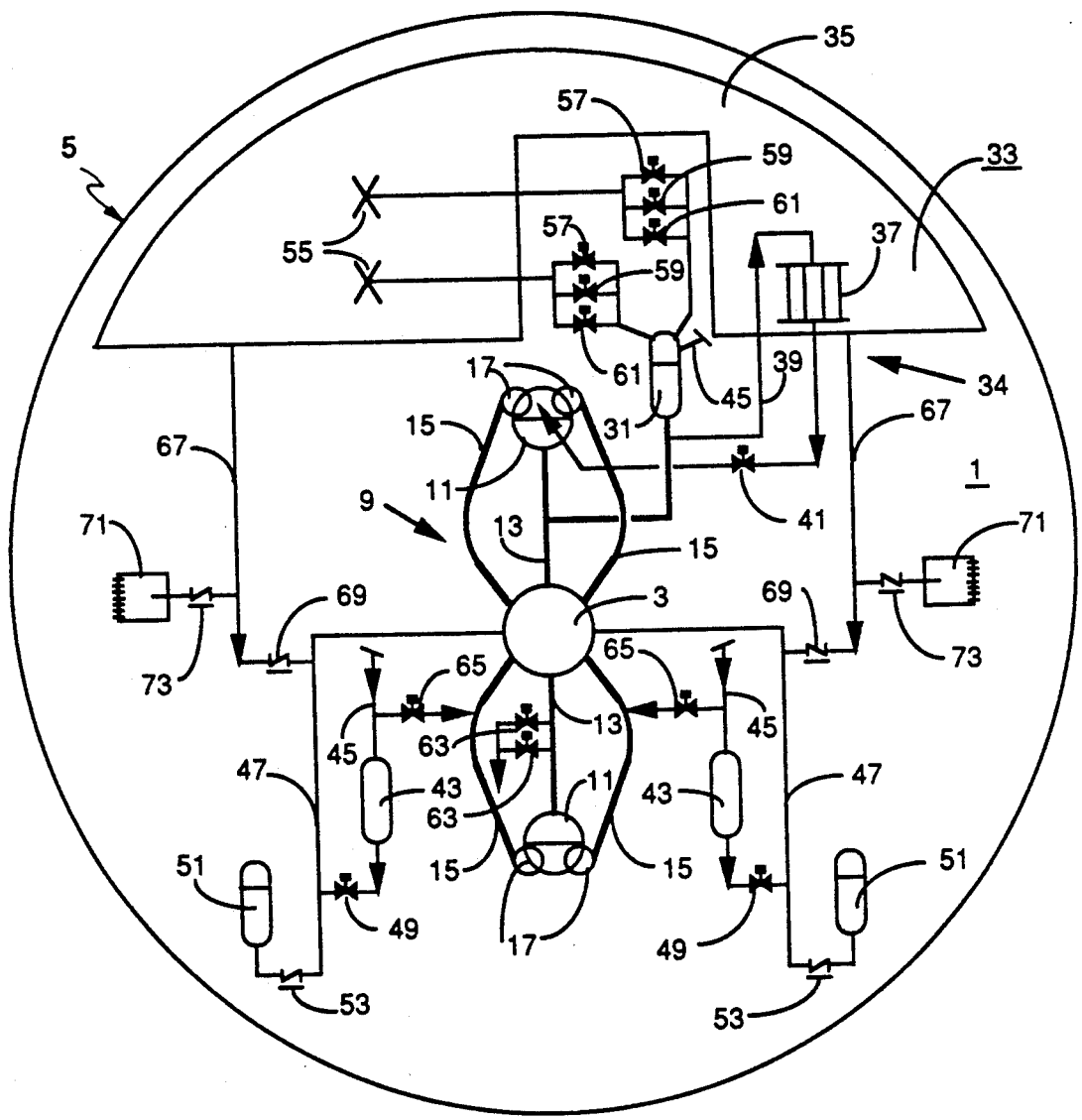
FIG. 1 is a schematic plan view of a pressurized water reactor incorporating the invention.
Figure 2:
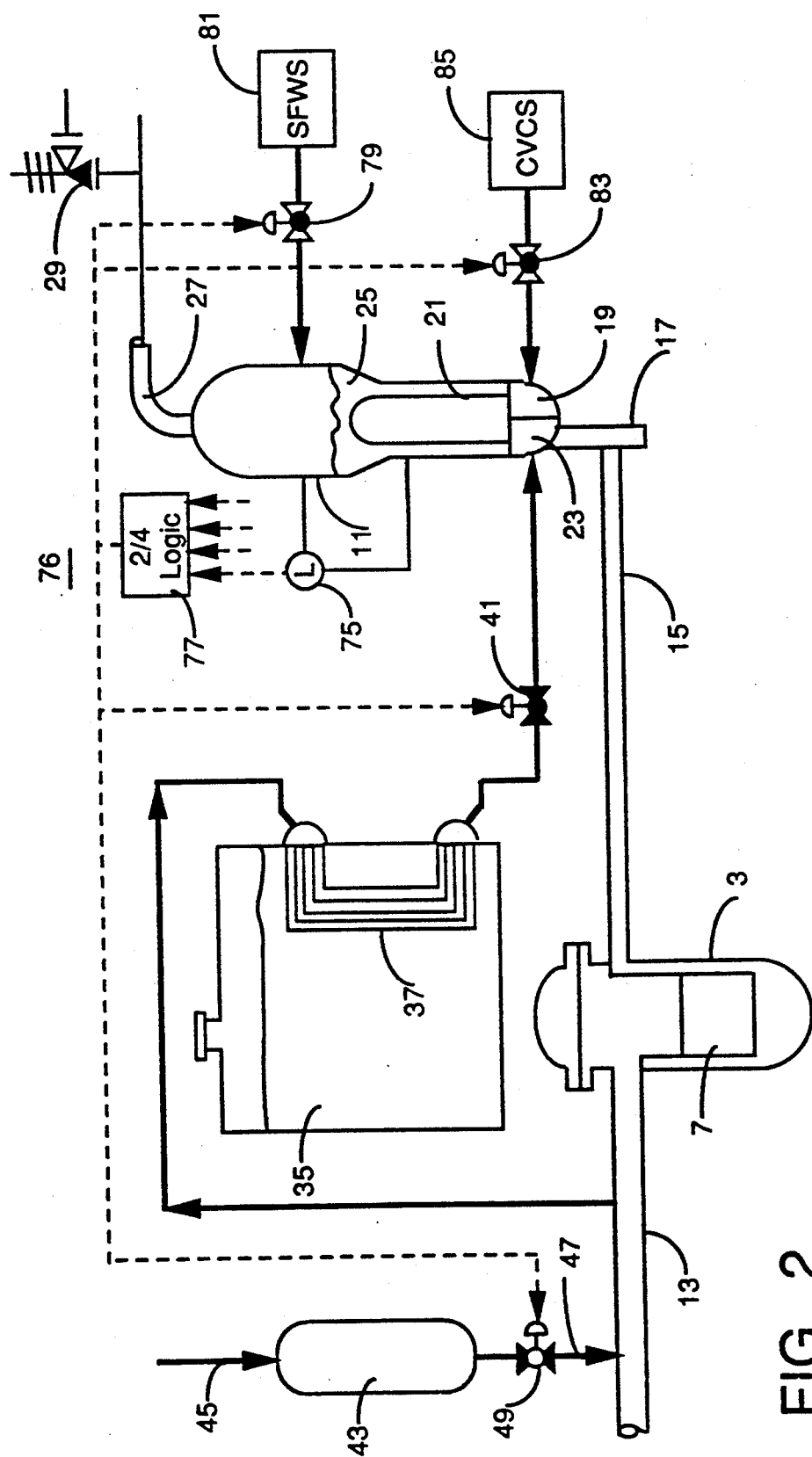
FIG. 2 is a schematic diagram illustrating the logic of the invention as applied to the pressurized water reactor illustrated in FIG. 1.

Referring to FIGS. 1 and 2, the PWR 1 to which the invention is applied includes a reactor vessel 3 supported inside containment 5. The reactor core 7 is supported inside the vessel 3 and is cooled by a reactor coolant system (RCS) 9. The RCS 9, or primary loop, includes a pair of steam generators 11 each connected to the reactor vessel 3 through a hot leg 13 and a pair of cold legs 15. Reactor coolant pumps 17 circulate reactor coolant in the form of light water through the core 7, the hot legs 13 to the steam generators 11 and back to the reactor vessel 3 through the cold legs 15.

Hot coolant from the hot leg 13 enters an inlet chamber 19 in a channel head in the bottom of the steam generator 11, passes through U-shaped heat transfer tubes 21 and into an outlet chamber 23 of the channel head from which it is pumped by the reactor coolant pumps 17 back to the reactor vessel 3 through the cold leg 15. A normal feed water system (not shown) supplies feed water 25 to the secondary side of the steam generator 11 to a level which normally covers the heat transfer tubes 21. The hot reactor coolant circulated through the tubes 21 converts the feed water 25 to steam which is delivered through a steam header 27 at the top of the steam generator 11 to a turbine generator (not shown) in a secondary loop. A pressure relief valve 29 in the steam header 27 prevents over-pressurization in the secondary loop by dumping steam to the atmosphere.

Returning to FIG. 1, a pressurizer 31 regulates the pressure in the primary loop.

The PWR is provided with passive safety systems 33 for the RCS. The passive safety systems 33 include a passive heat removal system 34 which utilizes the in containment refueling water storage tank (IRWST) 35. The IRWST 35 holds a large volume of cold coolant normally used during refueling. The passive heat removal system 34 includes a heat exchanger 37 immersed in the coolant in the IRWST 3 which is connected by first piping 39 with a first valve 41 to divert primary coolant from the hot leg 13 through the heat exchanger 39 and into the outlet chamber 23 of the channel head at the lower end of steam generator 11 and into the cold leg is thereby bypassing the heat transfer tubes 21 of the steam generator. This passive cooling system 35 is described in detail in U.S. Pat. No. 4,753,771 which is hereby incorporated by reference into this application.

The heat exchanger 37 and the hot and cold legs 13 and 15 are arranged such that even without the pump 17 operating hot coolant in the primary loop circulates by convection through the passive heat exchanger 37 when the valve 41 is open.

The passive safety systems 33 further include core make-up tanks 43. These tanks 43 contain reactor coolant and are pressurized by steam in the top of the pressurizer 31 through lines 45 (partially shown for clarity). The core make-up tanks 43 provide make-up coolant to the primary loop through second piping 47 and second valves 49 at the pressure set by the pressurizer 31.

The passive safety systems 33 also include accumulators 51 which provide additional reactor coolant to the primary loop at relatively low pressures through check valves 53 and the piping 47.

Another subsystem of the passive safety systems 33 is the automatic depressurization system 55. This subsystem includes spargers 55 located in the IRWST 35 and three sets of valves 57, 59, and 61 which open sequentially to relieve RCS pressure by dumping steam from the pressurizer 31. A fourth stage of depressurization reduces pressure in the RCS 9 to ambient pressure in containment through valves 63 in a line connected to a hot leg 13.

The passive safety systems 33 operate to maintain cooling of the reactor core 7. The passive heat removal subsystem 34 is actuated by a low level in the pressurizer 31 to open the valve 41 and divert reactor coolant through the passive heat exchanger 37. This reduces the temperature of the coolant which in turn will reduce the pressure. The valve 41 is also operated on a low steam generator feed water level.

The valves 49 and 65 of the core make-up tanks 43 are actuated by the low level signal in the pressurizer 31 to add coolant to the RCS at the pressure maintained by the pressurizer 31. Steam pressure provided to the core make-up tanks 43 from the pressurizer 31 through the lines 45 provides a relatively low flow rate of coolant from the core make-up tanks. A higher flow rate of coolant from the core make-up tank 43 is obtained through opening valves 65 connecting the core make-up tank 43 to a cold leg 15 in cases where more RCS inventory is lost, such as during a loss of coolant accident (LOCA). As the pressure drops in the RCS, additional coolant is provided by the accumulators 51 through the check valves 53.

In the event of a LOCA, the automatic depressurization system 55 is actuated by sequential opening of the valves 57, 59, and 61 to dump pressurized steam to the IRWST 35. As a final stage of depressurization, the valve 63 are opened to reduce RCS pressure to ambient pressure within containment. With the RCS depressurized, coolant in the IRWST 35 flows through fourth piping 67 and check valve 69 to flood the reactor vessel 3. Some of the coolant flooding the reactor is vaporized, condenses on the walls of containment 5 and is collected in sumps 71 from which it can flow through check valve 73 back to the reactor vessel.

As mentioned previously, the present invention is directed to apparatus and a method for responding to a rupture of a steam generator heat exchanger tube 21. This results in loss of primary coolant into the secondary side of the steam generator as the pressure in the RCS is higher than the pressure in the secondary side of the steam generator 11. The steam generator 11 is provided with a feed water level indicating system 75. This is a safety grade system which has four separate trains (only one shown in FIG. 2). The leakage of reactor coolant into the secondary side of the steam generator will cause the feed water level to rise which will be detected by the level detecting system 75. The normal feed water system (not shown) will terminate the addition of feed water to the steam generator in response to this rise in feed water level. However, the level will continue to rise due to the leak. If nothing is done to mitigate this situation, feed water can overflow into the steam header 27 and escape through the relief valve 29.

The passive safety systems described at this point would eventually respond to the ruptured steam generator tube. As the level of the pressurizer 31 falls due to the leak, the core make-up tanks 43 would begin to add coolant to the RCS 9. As the leak continued, the level of coolant in the core make-up tanks 43 would drop to a level which would open the valve 57 to dump the decay heat in the RCS into the IRWST 35 which would lower the pressure in the RCS to that in the secondary side of the steam generator and thereby terminate the leak. However, this would not occur until a considerable amount of coolant had overflowed from the steam generator into the steam header 27.

The present invention provides for a more rapid response to the tube rupture which is effective to terminate the leak before feed water can overflow into the steam header 27. In accordance with the invention, steam generator tube rupture mitigation apparatus 76 includes a logic unit 77 which generates a control signal when at least two out of four of the level detectors 75 indicate that the feed water level in the steam generator 11 has reached a predetermined high level indicative of a steam tube rupture. This control signal trips the reactor and opens the valve 41 to divert reactor coolant to the passive heat exchanger 37 and to short circuit the steam generator tubes. This cooling of the primary coolant reduces RCS pressure, and when the pressure in the RCS drops to the pressure in the secondary side of the steam generator, the leak will terminate. The control signal generated by the logic unit 77 simultaneously opens the valves 49 of the core make-up tanks 43 to maintain the inventory of coolant in the RCS. This does not add to the pressure in the RCS as the core make-up tanks 43 are pressurized by steam from the pressurizer 31 which is falling as the temperature of the coolant is reduced by the passive heat exchanger 37.

The control signal from the logic unit 77 is also simultaneously applied to close a valve 79 which isolates a start-up feed water system (SFWF) 81. The SFWF 81 supplies feed water at a low controlled rate during startup. It also serves as an emergency feed water supply which temporary maintains limited heat absorption capability of the steam generator should the main feed water system fail during operation. During a steam generator tube rupture event, central logic would normally stop the feed flow into the faulted steam generator, however this logic is not redundant or safety grade, so its failure has to be considered.

Furthermore, the control signal generated by the logic unit 77 when the feed water level in the steam generator rises above the predetermined high level also operates a valve 83 to isolate the chemical volume and control system (CVCS) 85. As mentioned the CVCS has high pressure pumps which would attempt to maintain pressure in the RCS as the passive heat exchanger attempted to lower the pressure.

With the invention, the passive heat exchanger 37 is placed in service quickly upon the detection of a high feed water level in the steam generator instead waiting until the level in the core make-up tanks has dropped to a low point which turns on the passive heat exchanger. Thus, reduction in RCS pressure commences immediately upon the detection of the high steam generator level. While the core make-up tanks 43 are also turned on immediately to replace lost coolant in the RCS, the pressure is reduced quickly enough that the feed water does not overflow into the steam header 27. Isolation of the SFWS 81 and the CVCS 85 prevent the addition of sufficient coolant to cause an overflow before RCS pressure can be brought down to the pressure in the secondary side of the steam generator. It is contemplated that the system of the invention can react sufficiently quickly to prevent feed water overflow not only for single tube ruptures, but also for several simultaneous tube ruptures in the range of about three to seven.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. In a pressurized water reactor having a reactor core within a reactor vessel, a steam generator having a plurality of heat transfer tubes, a reactor coolant system circulating reactor coolant through said reactor core and said heat transfer tubes of said steam generator under pressure in a primary loop, a pressurizer maintaining reactor coolant pressure in said primary loop, a turbine generator, a feed water supply system supplying feed water to said steam generator which covers said heat transfer tubes and is converted to steam which in turn is circulated to said turbine generator in a secondary loop through a steam line near the top of the steam generator, steam generator level indicating means measuring feed water level in said steam generator, and safety systems maintaining cooling of said reactor core and including a passive heat removal system comprising a cold coolant storage tank, a heat exchanger immersed in said cold coolant storage tank, and first piping with first valve means which when opened diverts reactor coolant in said primary loop through said heat exchanger to remove decay heat, the improvement comprising steam generator heat transfer tube rupture mitigation means comprising means responsive to a selected high level of feed water in said steam generator as measured by said steam generator feed water level indicating means to open said first valve means.

2. The pressurized water reactor of claim 1 wherein said safety systems further include core make-up tank means containing cold coolant and pressurized by said pressurizer, and second valve means connecting said core make-up tank means to said primary loop, and wherein said mitigation means include means responsive to said selected high level of feed water in said steam generator to open said second valve means whereby cold coolant is introduced into said primary loop as needed.

3. The pressurized water reactor of claim 2 wherein said feed water supply means includes a non-safety start-up feed water supply system and third valve means connecting said non-safety feed water supply system to said steam generator, and wherein said mitigation means includes means responsive to said selected high feed water level as measured by said steam generator level indicating means closing said third valve means when said feed water level is above said selected level.

4. The pressurized water reactor of claim 2 wherein said safety systems include a chemical and volume control system having pump means which provides additional coolant under pressure, and fourth valve means through which said additional coolant is introduced into the primary loop under pressure when open, and wherein said mitigating means includes means responsive to said steam generator level indicating means to close said fourth valve means when said steam generator level is above said selected level.

5. The pressurized water reactor of claim 4 wherein said feed water supply means includes non-safety start-up feed water supply system and third valve means connecting said non-safety feed water supply system to said steam generator, and wherein said mitigation means includes means responsive to said selected high feed water level as measured by said steam generator level indicator means closing said third valve means when said feed water level is above said selected level.

6. The pressurized water reactor of claim 1 wherein said feed water supply means includes non-safety start-up feed water supply system and third valve means connecting said non-safety feed water supply system to said steam generator, and wherein said mitigation means includes means responsive to said selected high feed water level as measured by said steam generator level indicator means closing said third valve means when said feed water level is above said selected level.

7. The pressurized water reactor of claim 1 wherein said safety systems include a chemical and volume control system which provides additional coolant to primary loop under pressure, and fourth valve means through which said additional coolant is introduced into the primary loop under pressure when open, and wherein said mitigating means includes means responsive to said steam generator level indicating means to close said fourth valve means when said steam generator level is above said selected level.

8. A method of mitigating a steam generator tube leak in a pressurized water reactor having a reactor core within a reactor vessel, a steam generator having a plurality of heat transfer tubes, a reactor coolant system circulating reactor coolant through said reactor core and said heat transfer tubes of the steam generator under pressure in a primary loop, a pressurizer maintaining pressure in the primary loop, a turbine generator, a feed water supply system supplying feed water to said steam generator which covers said heat transfer tubes and is converted to steam which in turn is circulated to said turbine generator in a secondary loop through a steam line through the top of the steam generator and a steam generator level indicator system measuring feed water level in said steam generator, said method comprising maintaining cooling of said reactor core while reducing pressure in said primary loop including monitoring said steam generator feed water level and when said level is above a preselected high level diverting reactor coolant through a heat exchanger immersed in a tank of cold water to reduce reactor coolant pressure at least to steam pressure in said secondary loop.

9. The method of claim 8 wherein maintaining cooling of said reactor core while reducing pressure in said primary loop further include introducing cold coolant into said primary loop at primary loop pressure.

10. The method of claim 9 wherein said feed water system includes a non-safety start-up feed water system and wherein said step of maintaining cooling of said reactor core while reducing pressure in said primary loop further includes terminating supply of feed water by said start-up feed water system in response to said selected high level of feed water in the steam generator.

11. The method of claim 8 wherein said pressurized water reactor includes a chemical and volume control system which supplies make-up reactor coolant to the primary loop under pressure to maintain pressure in said primary loop, and wherein mitigating a steam generator tube leak further includes isolating said chemical and volume control system from said primary loop in response to said selected high level feed water indication.

12. The method of claim 8 wherein said pressurized water reactor includes a chemical and volume control system which introduces reactor coolant into said primary loop under pressure to maintain primary loop pressure and wherein said feed water system includes a non-safety start-up feed water system, said mitigating a steam generator tube leak further includes isolating said chemical volume control system from said primary loop, terminating flow of feed water from said non-safety start-up feed water feed water system, and introducing cold coolant into said primary loop at the current pressure in said primary loop.

* * * * *